United States Patent [19]

Beyer et al.

[11] Patent Number: 5,705,788
[45] Date of Patent: Jan. 6, 1998

[54] PROCESS FOR TREATMENT OF MATERIALS WITH DIODE RADIATION

[75] Inventors: Eckhard Beyer, Roentgen; Konrad Wissenbach, Aachen; Volker Krause, Kirchheimbolanden, all of Germany

[73] Assignee: Fraunhofer-Gesellschaft zur Forderung der Angewandten Forschung E.V., Munich, Germany

[21] Appl. No.: 557,070

[22] PCT Filed: Mar. 8, 1994

[86] PCT No.: PCT/EP94/00706

§ 371 Date: Nov. 17, 1995

§ 102(e) Date: Nov. 17, 1995

[87] PCT Pub. No.: WO94/26459

PCT Pub. Date: Nov. 24, 1994

[30] Foreign Application Priority Data

May 19, 1993 [DE] Germany .......................... 43 16 829.9

[51] Int. Cl.[6] .................................................. B23K 26/00
[52] U.S. Cl. ............................. 219/121.62; 219/121.64; 219/121.66; 219/121.69; 219/121.72; 219/121.76; 219/121.83; 219/121.85; 148/512; 148/565
[58] Field of Search ................. 219/121.61, 121.62, 219/121.73, 121.74, 121.75, 121.76, 121.77, 121.83, 121.85, 121.66, 121.64, 121.72, 121.69; 148/565, 525, 512

[56] References Cited

U.S. PATENT DOCUMENTS

| | | | |
|---|---|---|---|
| 3,656,175 | 4/1972 | Carlson et al. | 347/250 |
| 4,689,482 | 8/1987 | Horikawa et al. | 219/121.61 |
| 4,696,104 | 9/1987 | Vanzetti et al. | 29/840 |
| 4,825,035 | 4/1989 | Moriyasu et al. | 219/121.61 |
| 4,914,272 | 4/1990 | Ito et al. | 219/121.76 |
| 4,963,714 | 10/1990 | Adamski et al. | 219/121.63 |
| 5,553,629 | 9/1996 | Keipert et al. | 128/898 |

FOREIGN PATENT DOCUMENTS

| | | |
|---|---|---|
| 0 252 268 | 1/1988 | European Pat. Off. . |
| 2142695 | 5/1990 | Japan . |
| 91/19539 | 12/1991 | WIPO . |
| 92/13668 | 8/1992 | WIPO . |

Primary Examiner—Philip H. Leung
Assistant Examiner—Gregory L. Mills
Attorney, Agent, or Firm—Herbert Dubno

[57] ABSTRACT

The invention relates to a process for material treatment with diode radiation, especially laser diode radiation. To match the radiation profile to the treatment process, the process is so carried out that radiation emitted from a multiplicity of diodes is directed with a predetermined radiation profile upon the treated region of the workpiece and that a change in the intensity distribution in the radiation profile is effected by controlling the diode output power.

19 Claims, 2 Drawing Sheets

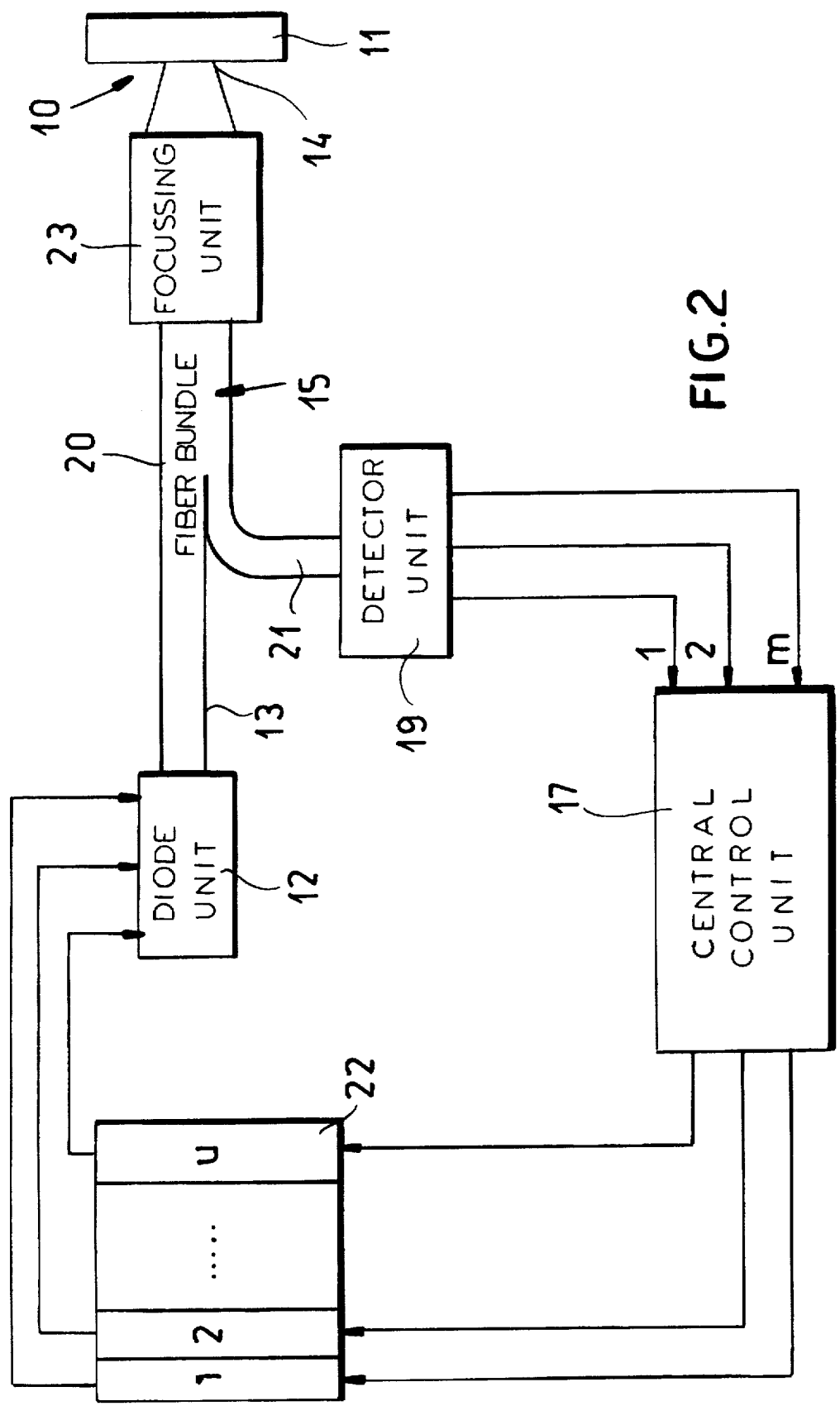

PROCESS FOR TREATMENT OF MATERIALS WITH DIODE RADIATION

CROSS REFERENCE TO RELATED APPLICATIONS

This application is a national phase of PCT/EP94/00706 filed 8 Mar. 1994 and based, in turn, on German national application P4316829.9 of 19 May 1993 under the International Convention.

FIELD OF THE INVENTION

The invention relates to a process for treatment of materials with diode radiation, especially laser diode radiation, in which the workpiece is welded, cut, bored, soldered and heat-treated, in each case considering the material of the workpiece.

BACKGROUND OF THE INVENTION

It is generally known to carry out treatment of materials with laser radiation. The laser radiation is generated by $CO_2$-eximer or Nd—YAG lasers which can achieve the requisite intensities of more than $10^3$ watt/cm. It is a disadvantage, however, that the efficiency is low, <10%, and on average the life of the laser system has a limited duration of about 10000 hours. Furthermore, the high thermal and mechanical sensitivity of the laser and the cost-intensive and labor-intensive maintenance associated therewith is disadvantageous. Cooling costs, power distribution cost and space for the set-up of the laser system are comparatively large.

The radiation profile of the laser beam is predetermined by the resonator of the laser. It can be changed by focusing optics, cylindrical mirrors, parabolic mirrors, facetted mirrors and integrators. The changes are, however, time-consuming and expensive.

A change in the radiation profile during the material treatment and especially in view of the respective treatment results, has been not possible heretofore.

OBJECT OF THE INVENTION

The invention has as its object a process for treatment of a material with diode radiation, especially laser diode radiation, such that matching of the radiation profile is possible without problems during the material treatment.

SUMMARY OF THE INVENTION

This object is achieved in that radiation emitted from a multiplicity of diodes is directed with a predetermined radiation profile on the treatment region of the workpiece and a variation of the intensity distribution of the radiation profile is effected by control of the diode output power.

More particularly, the object of the invention is attained by controlling intensity distribution in the radiation profile by controlling the diode output power.

For the invention, therefore, it is initially of significance that diode radiation is used to carry out the treatment of the material which derives from a multiplicity of diodes. The radiation components of the total radiation used for the treatment is thus influenced by providing the diodes or groups of diodes in diode units so that they are respectively controlled. The control affects the diode output power and thus the intensity of the radiation and also its distribution on the workpiece. The control can be effected with very short response times, for example, less than a millisecond. As a consequence, the change in the intensity distribution of the radiation profile can be effected on-line during the process. By comparison to conventional lasers, therefore an important possibility is opened by the invention, namely, that of matching the radiation profile and particularly the intensity distribution to the workpiece in accordance with the requirements of the treatment process.

For the invention it is primarily of significance that diode radiation is used for the material treatment which derives from a multiplicity of diodes. The radiation contributions to the diode radiation used for the treatment can be influenced in that the diode or a plurality of diodes forming diode units can be controlled. The control can influence the diode output powers and thus the intensity of the radiation and also its distribution upon the workpiece. The control can be effected in very short periods, especially in less than a millisecond. As a consequence, the change in the intensity distribution of the radiation profile can be effected during the process or on line. As a consequence, by comparison to conventional lasers, the invention has the advantage of matching of the radiation profile or intensity distribution upon the workpiece corresponding to the requirements of the treatment process.

The aforedescribed process is especially suitable for laser diodes which, by contrast with light-emitting diodes, are characterized by the emission of laser radiation. The process has also been found to be useable with advantage when the characteristics of laser radiation are not necessary for the material treatment. Also such diodes or diode units can have their output powers varied independently from one another so that a corresponding change in the radiation profile or the intensity distribution of the radiation upon the workpiece results.

A control of the laser output powers during the process of material treatment is advantageous when a predetermined process profile is prescribed, for example a heat irradiation of a transported workpiece with different radiation ranges. In one such case, the radiation profile of the process profile can be controlled according to a pattern or template. A feedback control based upon the treatment results is then not required. There are, however, also a number of processes for material treatment with the diode radiation in which the influence of the radiation profile depends upon how the treatment progresses on the workpiece. It also can be necessary, depending upon nondetermined geometry of the workpiece, that the radiation profile or radiation spots on the workpiece must be monitored. Such monitoring can be introduced to control the process. This can be carried out advantageously in that the temperature distribution brought about by the radiation profile is monitored in the treatment region during the irradiation and the variation of the intensity distribution is effected corresponding to the monitoring results. The monitoring result is, for example, a two-dimensional heat image of the workpiece surface. This can be obtained by scanning the surface of the workpiece and evaluating the results with a fast pyrometer or for example by a pickup from the treatment region with an array of detectors. The control can be effected in real time.

The process is advantageously so carried out that the multiplicity of diodes is assembled in at least one unit and the control of the diode output powers is effected diode-unit-wise. This process is especially advantageous when the multiplicity of diodes used can reach a higher power density. The unit-wise control of the diode output power can be effected with comparatively low control or regulation costs.

The process is so carried out that the diode units are connected with optical coupling means to radiation guides with which the diode radiation is focused on the treatment location. The conformation of the optical coupling means in detail depends upon the configuration and arrangement of the diodes. These are provided with collimator lenses because of their greater radiation angle by comparison to lasers. The collimator lenses can be microlenses for each individual laser diode or cylindrical collimator lenses which are provided for a plurality of laser diodes. The configuration of the coupling means depends also upon the arrangement of the individual laser diodes in a laser diode bar and/or in a laser diode wafer as well as upon the configuration of the cooling device for the diode. Reference can be made to the configuration of the radiation guide means provided in detail in German patent application P 42 34 342.9 whose disclosure in combination with the subject matter here described is subject matter of the present invention. The same applies also to the focusing means described there.

The diode radiation is transferred from the diodes to the workpiece and for that purpose radiation guide means in the form of light guide fibers can be used which individually or groupwise are associated with the diode units. By the association of light guide fibers with the diodes or the diode units on the one hand and by the arrangement of other light guide fibers opposite the workpiece, the radiation profile can be determined. A distribution of the light guide fibers over an entire surface can result in a corresponding large area irradiation of the workpiece which can be associated especially with the fact that the ends of the light guide fibers form the focusing means. The light guide fibers at the workpiece side can, however, be so provided that, for example, a collecting lens is used with which a focusing of the diode radiation upon a common point in the treatment region can be effected. The process of the invention is thus not only suitable for surface distribution of the radiation profile in the treatment region but also can involve concentration upon a small point, for example, keyhole welding.

For the process it is advantageous to detect the radiation profile with a detector. The measurement result of the detector is fed to a central control unit to control the diode output here. The detector can in this spatial configuration be matched to the respective radiation profile so that its location can be freely selectable, whereby the measurement result of the detector can be evaluated by a central control unit located at another place.

The detector can, however, also be configured independently from the spatial configuration of the radiation profile in that a partly transparent mirror can be disposed in the radiation path of the diode radiation to feed a fraction of the diode radiation fed to the matching location and/or a fraction of the diode radiation reflected from the latter to the detector. In this case, the partially transparent mirror in the path of the diode radiation is only slightly disturbing because, the power diverted by it is slight. On the other hand, it allows the spatial distribution of the radiation contributions of the individual diode radiations to be diverted with geometric precision so that a correspondingly precise image of the radiation profile is supplied. Correspondingly precise is the reflected diode radiation from the treatment location.

A monitoring of the treatment region of the workpiece can, however, also be effected in that a partially transparent mirror supplies heat and/or plasma radiation arising at the treatment location from the radiation path of the diode beam and feeds it via a filter transparent to the diode radiation to a detector unit for control of the diode output power. The partially transparent mirror deflects heat and/or plasma radiation from the radiation path of the diode radiation and the filter prevents the simultaneous diversion of reflected diode radiation to falsify the measurement results.

It is advantageous when the temperature distribution of the treatment region is detected at temporally short intervals completely and/or predetermined locations of the region have predetermined diode units juxtaposed therewith. The temporally brief intervals enable detection of the temperature distribution and a correspondingly brief affect upon the diode output power and thus the radiation profile. By assigning to predetermined locations of the region predetermined diode units, the apparatus can be simplified with key point formation, thereby accelerating adjustment, matching and control. For this detection, an evaluating unit can be used which can be disposed for example at a central control unit. An evaluating unit can then be used when the process is so carried out that, upon the detection of the temperature distribution in the treatment region overlapping of the diode radiation contribution produced by the diode units is ensured with a given arrangement between the radiation components and the diode units.

The process can be carried out further so that the radiation profile detecting detectors or the detectors which respond to the diode radiation reflected from the matching location are disposed directly in the radiation direction behind the diode units and/or the detector units responding to heat radiation emitted from the treatment location and/or detector units responding to plasma radiation are located in the emission direction directly behind a focusing unit. In this manner advantageously grouped components are achieved and affects on the measurement results are largely avoided.

The diode radiation can be advantageously transported with a fiber bundle of light conducting fibers from a diode unit to the treatment region. It is advantageous for one part of the light-conducting fiber bundle to serve for guiding the diode radiation to the treatment region while another part serves for guiding heat radiation and/or plasma radiation emitted from the treatment region. The result has a correspondingly simplified possibility for the detection of the heat image or the temperature distribution in the working region with light-conducting fibers which do not transfer diode laser radiation to the workpiece but operate in the opposite direction from the treatment surface to a corresponding sensor unit whereby an image of the workpiece surface is obtained through the focusing optics. To avoid the various effects on the light-conducting fibers which conduct the diode radiation to the treatment region, by the imaging from the treatment region, the process is so carried out that the other part of the light fiber bundle is arranged outwardly of the one part.

It is advantageous to use diode radiation in transformation hardening of metal workpiece regions or for local melting with a predetermined temperature profile, independently of local peculiarities. In both machining cases, the diode radiation generates a predetermined temperature profile which can be controlled independently of the surface characteristics of the treatment region, controlled independently of the local absorption of the radiation as well as independently of the workpiece geometry and can be held constant or varied in a targeted manner by diode output power regulation.

Diode radiation can also be used in shaping and bending a workpiece whereby the temperature distribution of the treatment region and also the treatment determined geometry are a result of control of the diode output power. The reforming and bending of the workpiece is effected taking into consideration the deforming process whereby the diode output power can be controlled, corresponding to a greater or lesser power used for deformation.

The use of diode radiation for local heating to change the lattice structure, to reduce intrinsic stresses or for cutting of workpieces, especially for burning-loss stabilized laser beam burner cutting in each case with control of the radiation profile, can be carried out by controlling the radiation profile or the intensity distribution of the diode radiation in view of the recrystalliza-tion characteristics, the intrinsic stress formation or the oxygen reaction. Especially in contour cutting with small radii, edges or corners, over-reaction resulting from a thermal buildup in peaks and on the inner sides of curves can be avoided.

In the welding of workpieces for local preheating and afterheating in the region of the weld location, especially with control of the radiation profile, the diode radiation can be used with advantage. The preheating is effected, as a rule, only several millimeters ahead of the welding location and enables a reduction in the energy which must be delivered. The control of the diode output power can, however, also be used in such manner that the diode radiation assumes the supply of all of the controlled energy during welding so that the main welding beam can remain uncontrolled, thereby resulting in a significant reduction in the control cost. In afterheating, the surface bead which is still hot can be smoothed by renewed melting or slow hardening, smoothing out thereby any burned-in notches or rises of the seam. With still molten metallic zones, the formation of melt-instabilities can be avoided.

Diode radiation can advantageously also be used to vaporize impurities or coatings from workpieces locally, especially zinc, lacquer, wax, plastics, etc.

Diode radiation can also be used to locally heat a melt pool in welding, especially in the region of the back side of a vapor capillary. Surface stresses which arise as a result of temperature gradients in a melt pool can then be suppressed so that the melt movement is effected uniformly and the formation of Humping drops is avoided. The use of the diode radiation in addition to a laser beam in welding enables, because of the simple control of the diode output power, an advantageous effect in the sense of an improvement in the welding results.

Advantageously, further, the use of diode radiation for local heating of a workpiece to support a chip-removal machining operation. Heating serves especially to support a lathe-turning or milling and improves the useful life of the workpiece and improves the machining results.

Control of the intensity distribution of the laser radiation can also be used for soldering of the workpieces with control of the diode output power to melt the solder and heat the workpiece free from overheating, whereby the wetting of the parts to be connected without local overheating and without spray formation by flux can be achieved.

BRIEF DESCRIPTION OF THE DRAWING

The above and other objects, features, and advantages will become more readily apparent from the following description, reference being made to the accompanying drawing in which:

FIG. 2 is a view similar to FIG. 1 with different components.

SPECIFIC DESCRIPTION

Figure 1:
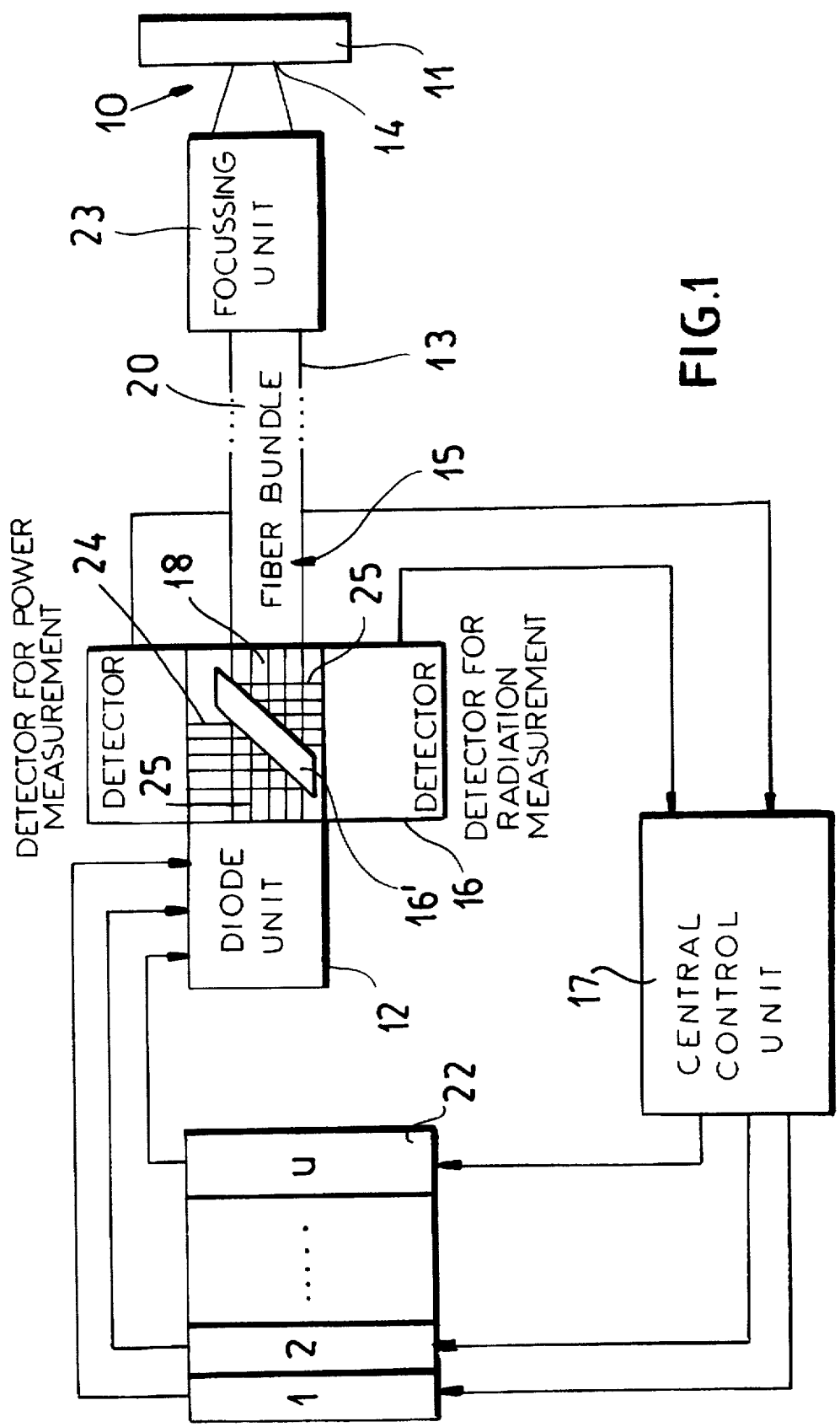
FIG. 1 is a schematic block diagram of an apparatus for material treatment with diode radiation.

In FIG. 1 a diode unit 12 is illustrated which in its physical form is comprised of a multiplicity of individual diodes or from a multiplicity of diode units with components which, in turn, have each a plurality of diodes. This is seen especially from block 22 which has powers-supply networks 1, 2 ... u provided respectively for each diode unit and correspondingly is in circuit with 12.

From the diode unit 12 emitted radiation travels along the radiation path 18 provided with radiation guide means 13 to a workpiece 11 and the beam guide means 13 and focusing the diode radiation on a treating location 14 in the treatment region 10 of the workpiece 11. The radiation guide means 13 are, for example, light-conducting fibers 15 in the form of a fiber bundle 20. From these light-conducting fibers 15, the focusing unit 23 receives the diode radiation, for example, by means of a collecting lens.

Between the diode unit 12 and the radiation guide means 13, a detector 16 is provided which enables control of the radiation profile of the diode radiation. The detector 16 is provided with a partially transparent mirror 16' which diverts a small fraction 23 of the diode beam. As is apparent from the schematic illustration, the diode beam portion 25 produced by the diode unit is diverted in an orientation-true manner and thus represents the flat distribution of the diode beam portion or determines the radiation profile. The further part of the diode beam deflected by the mirror 16' is that which is reflected from the workpiece 11. This fraction of the reflected diode beam is passed from the workpiece 11 via the radiation guide means 13 to the partially transparent mirror 16' of this detector 16. The reflected diode beam 25 from the treatment location or the treatment region 10 is detected corresponding to its local distribution so that a corresponding two-dimensional reflected image of the treatment location or the treatment region 10 is produced. The detector 16 is connected with a central control unit 17 to supply its two detection results thereto, the control unit evaluating the measured results. Corresponding to the evaluation, the control unit 17 controls the network unit of block 22 and thus the output power and the diodes or the diode unit 12. Since the detection of the diode radiation is carried out in temporally brief intervals, a correspondingly rapid or on-line control of the diode output power is possible.

In FIG. 2 the construction of the apparatus is modified in that instead of one detector, a detector unit 19 is used which obtains the thermal and/or plasma radiation emitted from the treatment region 10. The unit 19 is coupled with the focusing unit 23 via a part 21 of the fiber bundle 15, whereby this part 21 is external of the other part of the light-conducting fiber bundle 20 which serves exclusively to guide the diode radiation to the treatment region 10.

With the detector unit 19, which is arranged in the emission direction directly behind the focusing unit 23, a thermal image of the treatment location 14 or the treatment region 10 is obtained which, for example, because of the number and orientation light-conducting fibers of the bundle portion 21, permits a localized monitoring of each different position in the treatment region 10. By coupling the detector unit 19 to the central control unit 17, the determined thermal image is evaluated and used for control of the individual diode units so that the radiation distribution is so influenced that the workpiece can be treated in the desired manner.

We claim:

1. A process for material treatment with diode radiation comprising the steps of:
    (a) emitting diode radiation from a plurality of diodes and directing the emitted radiation upon a treatment region of a workpiece;
    (b) varying an intensity distribution of a radiation profile of the radiation directed upon said region by controlling an output power of at least some of said diodes;

(c) monitoring a temperature distribution of the treatment region produced by radiation from said diodes during irradiation thereof; and (d) controlling the variation of the intensity distribution in accordance with results of the monitoring.

2. The process defined in claim 1 wherein said plurality of diodes is assembled in a plurality of diode units and control of the output power is effected by controlling the power outputted from said units.

3. The process defined in claim 2 wherein said diode units are connected via optical coupling means to radiation guide means, the process further comprising focussing diode radiation from said guide means upon a working location of said region.

4. The process defined in claim 3 wherein light-conducting fibers are used as said radiation guide means, said process further comprising selectively juxtaposing said light-conducting fibers with said diodes individually and as grouped in said units.

5. The process defined in claim 1 wherein said radiation profile is detected with a detector, further comprising feeding measurement results from said detector to a central control unit for control of said output power.

6. The process defined in claim 5, further comprising arranging in a radiation path of radiation from said diodes a partially transparent mirror deflecting a fraction of radiation from diodes to said treatment region and a fraction of radiation from said diodes to said detector.

7. The process defined in claim 1, further comprising the steps of interposing a partially transparent mirror in a path of radiation from said diodes for deflecting heating radiation from said region, and feeding a detector unit for control of said output power through a filter impermeable to radiation from said diodes.

8. The process defined in claim 1 wherein temperature distribution is selectively detected over the entire region and over a predetermined location in said region irradiated by predetermined diode units containing groups of said diodes.

9. The process defined in claim 8 wherein detection of the temperature distribution of said region responds to overlapping radiation from a plurality of said diode units.

10. The process defined in claim 1 wherein radiation from said diodes is focussed on said region by a focussing unit, said radiation profile being detected by a detector unit positioned directly behind said focussing unit.

11. The process defined in claim 1, further comprising the step of guiding diode radiation to said region through a portion of a light fiber bundle and guiding emitted radiation from said region away therefrom through another portion of said light fiber bundle.

12. The process defined in claim 11, further comprising arranging one of said portions of the light fiber bundle outside of the other portion of said light fiber bundle.

13. The process defined in claim 1, further comprising the step of selectively effecting transformation hardening of said region and local melting of said region with said diode radiation.

14. The process defined in claim 1, further comprising the step of reforming and bending said workpiece in said region while controlling said output power at least in part in response to the geometry thereof.

15. The process defined in claim 1, further comprising the step of selectively effecting lattice structure alteration, reduction of intrinsic stress and laser cutting in said region with said diode radiation.

16. The process defined in claim 1, further comprising welding of said workpiece at said region.

17. The process defined in claim 1, further comprising selectively evaporating impurities and coating from said region.

18. The process defined in claim 1, further comprising effecting chip removal machining of said region.

19. The process defined in claim 1, further comprising melting solder in said region.

* * * * *